Patented June 24, 1952

2,601,624

UNITED STATES PATENT OFFICE 2,601,624

COPRECIPITATED ALUMINA-METAL OXIDE GEL CATALYSTS AND THEIR PREPARATION

James R. Owen and John W. Myers, Bartlesville, Okla., assignors to Phillips Petroleum Company, a corporation of Delaware No Drawing. Application December 3, 1947, Serial No. 789,568

25 Claims. (Cl. 252—463)

This invention relates generally to the manufacture of catalysts and more particularly to a method for improving the mechanical strength or the crushing strength of catalyst pills or pellets.

Solid catalysts are extensively employed in many processes among which are aromatization, isomerization, hydrocarbon synthesis, dehydrogenation, and hydrogenation. The individual catalyst particles employed in these processes are frequently given a relatively uniform shape and size by subjection of the catalyst to such operations as pilling, pelleting or extrusion. The specific methods of catalyst preparation are too numerous to mention, but in many of the methods the essential step is the impregnation of an inert binding or supporting material with the catalytically active material. This has been accomplished by direct admixture of the catalytic materials or by mixing the hydroxides or certain salts of the two materials and then subjecting the resulting mixture to calcination and volatilization. The mixing process is usually followed by the extruding or pelleting operations.

Frequently the catalysts produced by the above operations do not function properly under conditions of repeated use or they may be the cause of inefficient operation because the catalyst particles lack the necessary cohesive and binding qualities. Consequently, during handling or use in the process the catalysts will be crushed into small particles or powder causing a decrease in production and loss of catalyst.

An object of this invention is to provide a method for improving the crushing strength of catalyst pills or pellets. A further object of this invention is to provide a method for preparing a catalyst of improved crushing strength. Additional objects will be apparent from the disclosure.

We have found that the crushing strength of catalyst pills or pellets can be markedly improved by impregnating the pills or pellets with solutions of certain metal salts, as by dipping, and then drying and calcining the resulting mixture. The process is especially applicable to coprecipitated gel type catalysts comprising essentially one or more metal oxides.

In practicing our invention the catalyst pills or pellets are prepared by any known method, and then the resulting catalyst particles are dipped into a solution of a metal salt, preferably a water soluble compound of one of the components of the catalyst being treated. In general the impregnation is carried out by dipping the catalyst pills or pellets in a solution of a metal salt which upon thermal decomposition will produce one of the metal oxide components of the catalyst, i. e., a catalyst comprising oxides of aluminum, chromium and vanadium may be dipped in a solution of chromium nitrate which, after thermal treatment, leaves the catalyst impregnated with the chromium oxide. Where the oxides are water soluble, as in this case of chromium trioxide, it may be used directly as the impregnating material. The solution used for dipping can be of any suitable concentration, but a concentration approaching saturation is preferable in order to prevent dissolving of the catalyst in the dipping solution, and it is usually preferable to use a concentration of at least 10 per cent. Any dipping temperature can be used that is satisfactory for maintaining the concentration of the dipping solution at the level desired. After the dipping procedure the catalyst is dried by any suitable method, preferably in a stream of air, and then heated to a temperature of from 600° F. to 1200° F. By this procedure the salts are decomposed to the corresponding oxides. The impregnation with the added oxide usually increases the weight of the treated pellets by about 1 to 50 per cent.

This treatment will substantially increase the crushing strength of the catalyst pellets or the like, and thus reduce the tendency to crush into smaller particles and powder during use. A catalyst having a crushing strength too low to be of practical use can be improved, by using the procedure of our invention, to such an extent that its use is made possible. It may be noted that the impregnation treatment referred to is applied to catalysts by the incorporation of a metal oxide which is already a component of the catalyst. Thus the treatment does not function to promote or otherwise modify the catalyst activity but merely to increase strength as described. The process is applicable to metal oxide type catalysts composed of one or more metal oxides. It is particularly applicable to aluminum oxide catalysts composed of aluminum oxide alone mixed with chromium oxide, beryllium oxide, vanadium oxide, etc. or mixtures with one or more of such materials.

The following examples are indicative of the results that can be achieved by the use of our invention.

EXAMPLES

I. Catalyst preparation

Eighteen butane-dehydrogenation catalysts were prepared as described below in the form of cylindrical pills ⅛-inch in diameter and length, and were used as pelleted or were impregnated with aqueous salt solutions. The catalysts were of two main types as described below under (a) and (b).

| (a) Catalyst No. | Composition, weight per cent |
|---|---|
| 1215-57 | 10 $Cr_2O_3$-30 $V_2O_5$-60 $Al_2O_3$. |
| 1215-70 | 26 $Cr_2O_3$-22 $V_2O_5$-52 $Al_2O_3$. |
| 1215-81 | 50 $Cr_2O_3$-25 $V_2O_5$-25 $Al_2O_3$. |

These three catalysts were prepared by slowly adding 3 per cent aqueous ammonia to mixed solutions of aluminum and chromium nitrates and vanadium pentoxide dissolved in hydrogen peroxide. After a pH of 7.1 to 7.4 was reached, the gel was settled for 12 to 60 hours and filtered. The precipitate was dried for 40 to 80 hours at 190° F., heated to 750° F. in 30 minutes, kept at that temperature for 23 to 25 hours, ground and pilled. The pills were heated to 600° F. in a stream of nitrogen and kept at 600° F. for about 4 hours in a stream of air.

| (b) Catalyst No. | Composition, weight per cent |
|---|---|
| 2091-82A | 40 $Cr_2O_3$-10 BeO-50 $Al_2O_3$. |
| 2091-74B | 40 $Cr_2O_3$-10 BeO-50 $Al_2O_3$. |

These two catalysts were prepared by slowly adding 57 per cent aqueous ammonia to a vigorously stirred mixed solution of chromium, beryllium and aluminum nitrates. After a pH of 7.4 was reached, the mixture was filtered; the precipitate was dried for 52.5 hours at 200° F., heated to 750° F. in 30 minutes, and kept at 750° F. for 24 hours. The residue was exposed to air for 24 hours to absorb moisture, ground and pilled. The pills were heated to 1000° F. in about 6 hours and kept at that temperature for about 18 hours.

(c) Eight of the catalysts were made by impregnating portions of the pilled chromia-vanadia-alumina gels from (a) with aqueous salt solutions, drying at 230° F., and calcining at 600° F. for about four hours in a stream of air:

| Catalyst | Composition, weight per cent |
|---|---|
| 1215-57G | 10 $Cr_2O_3$-30 $V_2O_5$-60 $Al_2O_3$ coprecipitated gel plus approximately 5 BaO by impregnating with 25 per cent barium acetate solution. |
| 1215-57H | 10 $Cr_2O_3$-30 $V_2O_5$-60 $Al_2O_3$ coprecipitated gel plus 7 $Cr_2O_3$ by impregnating with 30 per cent chromium trioxide solution. |
| 1215-57I | 10 $Cr_2O_3$-30 $V_2O_5$-60 $Al_2O_3$ coprecipitated gel plus 13 $Cr_2O_3$ by impregnating twice with 30 per cent chromium trioxide solution. |
| 1215-57J | 10 $Cr_2O_3$-30 $V_2O_5$-60 $Al_2O_3$ coprecipitated gel plus 19 $Cr_2O_3$ by impregnating three times with 30 per cent chromium trioxide solution. |
| 1215-70B | 26 $Cr_2O_3$-22 $V_2O_5$-52 $Al_2O_3$ plus 7 $Cr_2O_3$ by impregnating with 30 per cent chromium trioxide solution. |
| 1215-70D | 26 $Cr_2O_3$-22 $V_2O_5$-52 $Al_2O_3$ plus 37 $Cr_2O_3$ by impregnating six times with 30 per cent chromium trioxide solution. |
| 1215-81A | 50 $Cr_2O_3$-25 $V_2O_5$-25 $Al_2O_3$ plus 17 $Cr_2O_3$ by impregnating three times with 30 per cent chromium trioxide solution. Dried at 230° F. after each impregnation and finally calcined at 600° F. |
| 1215-81B | 50 $Cr_2O_3$-25 $V_2O_5$-25 $Al_2O_3$ plus 17 $Cr_2O_3$ by impregnating three times with 30 per cent chromium trioxide solution. Calcined at 600° F. after each impregnation. |

(d) Five of the catalysts were prepared by impregnating portions of the 40 chromia-10 beryllia-50 alumina gels from (b) with aqueous salt solution, drying at 230° F., and calcining at 1000° F.; there were weight losses during calcining and the final compositions are not known accurately:

| Catalyst | Description |
|---|---|
| 1215-92A | 2091-74B (40 $Cr_2O_3$-10 BeO-50 $Al_2O_3$) plus approximately 5 $Cr_2O_3$ by impregnating with 30 per cent chromium trioxide solution. |
| 1215-92B | 2091-74B (40 $Cr_2O_3$-10 BeO-50 $Al_2O_3$) impregnated with approximately 25 per cent chromium nitrate solution. |
| 1215-92C | 2091-74B (40 $Cr_2O_3$-10 BeO-50 $Al_2O_3$) impregnated with approximately 49 per cent beryllium nitrate solution. |
| 1215-92D | 2091-74B (40 $Cr_2O_3$-10 BeO-50 $Al_2O_3$) impregnated with approximately 38 per cent aluminum nitrate solution. |
| 1215-95 | 2091-82A (40 $Cr_2O_3$-10 BeO-50 $Al_2O_3$) plus approximately 12 $Cr_2O_3$ by impregnating with 30 per cent chromium trioxide solution. |

The aqueous salt solutions were added to individual pills dropwise so that no catalyst would be lost in the solutions. The amount of material added was determined by weighing the pills before impregnation and after calcination.

II. Crushing strength of catalyst pills

The crushing strength of ten pills of each catalyst mixture was measured with a lever-type crushing machine that is a modification of the one described by Harford (Ind. Eng. Chem., Anal. ed. 10, 40 (1938). The pill was laid with its cylindrical side on and its longitudinal axis parallel to an anvil ½-inch long and 1/16-inch wide and was crushed with a hammer of the same dimensions.

| Catalysts Used With Steam Dilution | | Avg. Crushing Strength, Grams |
|---|---|---|
| 1215-57: | 10 $Cr_2O_3$-30 $V_2O_5$-60 $Al_2O_3$ coprecipitated gel—unused. | 437 |
| 1215-57G: | 10 $Cr_2O_3$-30 $V_2O_5$-60 $Al_2O_3$ coprecipitated gel plus 5 BaO by impregnation—used one cycle, not regenerated. | 409 |
| 1215-57H: | 10 $Cr_2O_3$-30 $V_2O_5$-60 $Al_2O_3$ coprecipitated gel plus 7 $Cr_2O_3$ by impregnation—used one cycle, not regenerated. | 3,380 |
| 1215-57I: | 10 $Cr_2O_3$-30 $V_2O_5$-60 $Al_2O_3$ coprecipitated gel plus 13 $Cr_2O_3$ by impregnation—used three cycles, regenerated. | 730 |
| 1215-57J: | 10 $Cr_2O_3$-30 $V_2O_5$-60 $Al_2O_3$ coprecipitated gel plus 19 $Cr_2O_3$ by impregnation—used one cycle, regenerated. | 745 |
| 1215-70: | 26 $Cr_2O_3$-22 $V_2O_5$-52 $Al_2O_3$ coprecipitated gel—unused. | 365 |
| 1215-70B: | 26 $Cr_2O_3$-22 $V_2O_5$-52 $Al_2O_3$ coprecipitated gel plus 7 $Cr_2O_3$ by impregnation—used one cycle, not regenerated. | 581 |
| 1215-70D: | 26 $Cr_2O_3$-22 $V_2O_5$-52 $Al_2O_3$ coprecipitated gel plus 37 $Cr_2O_3$ by impregnation—used one cycle, not regenerated. | 9,070 |
| 1215-81: | 50 $Cr_2O_3$-25 $V_2O_5$-25 $Al_2O_3$ coprecipitated gel—used one cycle, regenerated. | 179 |
| 1215-81A: | 50 $Cr_2O_3$-25 $V_2O_5$-25 $Al_2O_3$ coprecipitated gel plus 17 $Cr_2O_3$ by impregnation—unused. | 5,270 |
| 1215-81B: | 50 $Cr_2O_3$-25 $V_2O_5$-25 $Al_2O_3$ coprecipitated gel plus 17 $Cr_2O_3$ by impregnation—used fifteen cycles, regenerated. | 2,200 |
| 2091-74B: | 10 BeO-40 $Cr_2O_3$-50 $Al_2O_3$ coprecipitated gel—unused. | 728 |
| 1215-92A: | 2091-74B (10 BeO-40 $Cr_2O_3$-50 $Al_2O_3$) plus approximately 5 $Cr_2O_3$ by impregnating with chromium trioxide solution—unused. | 1270 |
| 1215-92B: | 2091-74B (10 BeO-40 $Cr_2O_3$-50 $Al_2O_3$) impregnated with chromium nitrate solution—unused. | 1930 |
| 1215-92C: | 2091-74B (10 BeO-40 $Cr_2O_3$-50 $Al_2O_3$) impregnated with beryllium nitrate solution—unused. | 2520 |
| 1215-92D: | 2091-74B (10 BeO-40 $Cr_2O_3$-50 $Al_2O_3$) impregnated with aluminum nitrate solution—unused. | 3890 |
| 2091-82A: | 10 BeO-40 $Cr_2O_3$-50 $Al_2O_3$ coprecipitated gel—unused. | 3640 |
| 1215-95: | 2091-82A (10 BeO-40 $Cr_2O_3$-50 $Al_2O_3$) plus approximately 12 $Cr_2O_3$ by impregnating with chromium trioxide solution—used six cycles, regenerated. | 11,800 |

The markedly different strengths of catalysts 2091-74B and 2091-82A before treatment with the salt solutions resulted from deliberately pelleting 2091-82A at a much higher pressure and possibly also from different precipitation conditions.

The thermal-conductivity hydrogen-sensitive gas analyzer indicated a yield per pass of n-butenes plus butadiene of about 40.2 for both 2091-82A and 1215-95 at 1020° F. and 750 vol./vol./hr. (STP) space velocity of normal butane.

The above data indicates that impregnating coprecipitated-gel catalyst pills with from 1 to about 50 parts of chromium trioxide, chromium nitrate, beryllium nitrate or aluminum nitrate per 100 parts of catalyst containing as a constituent an oxide of any of the above metals will increase the pill strength—in some cases as much as twenty-five fold. The greater pill strength obtained by impregnation generally increases with an increase in concentration of the impregnating solution. Impregnating the pills with other salts, such as barium acetate solution does not appear to increase the strength, indicating that not all metal salts are effective for the improvement in catalyst strength.

Standard activity tests on the chromia-beryllia-alumina steam-sensitive catalysts using a thermal-conductivity hydrogen sensitive gas analyzer indicate about the same activity before and after impregnation. This indicates that the impregnation of these catalysts has no promoting effect but merely serves to increase pill strength.

We claim:

1. The method of increasing the mechanical strength of coprecipitated gel catalyst pellets compacted from particulate catalyst consisting essentially of aluminum oxide and at least one metal oxide selected from the group consisting of the oxides of chromium, vanadium, and beryllium, which comprises impregnating the formed pellets with a solution of a compound of one of said metals, and calcining the impregnated pellets so as to effect the conversion of said compound to the oxide and increase the crushing strength of the pelleted catalyst.

2. The method according to claim 1 wherein the coprecipitated gel comprises alumina, chromia and beryllia.

3. The method according to claim 1 wherein the copreciptated gel comprises alumina, chromia and vanadia.

4. The method of increasing the mechanical strength of coprecipitated gel catalyst pellets already compacted from catalyst particles consisting essentially of aluminum oxide and a plurality of metal oxides selected from the group consisting of the oxides of chromium, vanadium, and beryllium, which comprises impregnating said catalyst pellets with a solution of a compound of one of the constituent metals and calcining the impregnated pellets so as to effect the conversion of said compound to the oxide and increase the crushing strength of the pellets.

5. A method according to claim 4 in which the metal oxide components of the catalyst are present in the proportions, 10 $Cr_2O_3$-30 $V_2O_5$-60 $Al_2O_3$.

6. A method according to claim 5 in which the metal oxide used for impregnation is chromic oxide.

7. A method according to claim 4 in which the metal oxide components of the catalysts are present in the proportions, 40 $Cr_2O_3$-10 BeO-50 $Al_2O_3$.

8. A method according to claim 7 wherein the metal oxide used for impregnation is chromic oxide.

9. The method of increasing the mechanical strength of coprecipitated gel catalyst pellets already compacted from catalyst particles consisting essentially of aluminum oxide and a plurality of metal oxides selected of the group consisting of chromium, vanadium, and beryllium, which comprises impregnating said pellets with a solution of a chemical compound which upon thermal decomposition yields a metal oxide which is already a component of said catalyst, and calcining the impregnated catalyst pellets so as to convert said compound to the oxide and increase the mechanical strength thereof.

10. A method according to claim 9 in which the metal oxide components of the catalyst are present in the proportions, 40 $Cr_2O_3$-10 BeO-50 $Al_2O_3$, and the impregnating chemical compound is $Cr(NO_3)_3$.

11. A method of increasing the mechanical strength of a catalyst pellet compacted from catalyst particles consisting essentially of aluminum oxide and a plurality of metal oxides selected from the group consisting of the oxides of chromium, vanadium, and beryllium, which comprises impregnating the formed pellet with a solution of a compound of one of said metals, convertible to the oxide by calcination in an amount sufficient to increase the weight of the finished pellet between 1 and 50 per cent, and calcining the impregnated pellet so as to effect the conversion of said compound to the oxide and increase the mechanical strength of the pellet.

12. The method of claim 11 in which the catalyst contains a mixture of the oxides of aluminum, chromium, and beryllium and the impregnating solution is an aqueous solution of a chromium compound.

13. The method of claim 12 in which the chromium compound is chromic acid.

14. The method of claim 11 in which the impregnating compound is a solution of a chromium compound.

15. The method of claim 11 in which the impregnating compound is a solution of a beryllium compound.

16. The method of claim 11 in which the impregnating compound is a solution of an aluminum compound.

17. The method of claim 11 in which the impregnating solution is a solution of aluminum nitrate.

18. The method of claim 11 in which the impregnating compound is a solution of a vanadium compound.

19. The method of claim 11 in which the catalyst contains a mixture of the oxides of aluminum, chromium, and vanadium and the impregnating solution is a compound of chromium.

20. The method of claim 19 in which the chromium compound is chromium nitrate.

21. A method of increasing the mechanical strength of a catalyst pellet compacted from catalyst particles consisting essentially of aluminum oxide and at least one metal oxide selected from the group consisting of the oxides of chromium, vanadium, and beryllium, which comprises impregnating said pellet with a solution of a compound of one of said metals convertible to the oxide by calcination in an amount sufficient to increase the weight of the finished pellet between 1 and 50 per cent, and calcining the impregnated pellet so as to effect the conversion of said compound to the oxide and thereby increase the mechanical strength of the pellet.

22. As a new article of manufacture a pelleted alumina-metal oxide catalyst of improved mechanical strength prepared by the method of claim 4.

23. As a new article of manufacture a pelleted alumina-metal oxide catalyst of improved mechanical strength prepared by the method of claim 21.

24. As a new article of manufacture a pelleted alumina-chromia-beryllia catalyst of improved mechanical strength prepared by the method of claim 11.

25. As a new article of manufacture a pelleted alumina-chromia-vanadia catalyst of improved mechanical strength prepared by the method of claim 11.

JAMES R. OWEN.
JOHN W. MYERS.

REFERENCES CITED

The following references are of record in the file of this patent:

UNITED STATES PATENTS

| Number | Name | Date |
|---|---|---|
| 2,249,337 | Visser et al. | July 15, 1941 |
| 2,296,406 | Spicer et al. | Sept. 22, 1942 |
| 2,391,358 | Spicer et al. | Dec. 18, 1945 |
| 2,392,248 | Layng et al. | Jan. 1, 1946 |
| 2,411,829 | Huffman | Nov. 26, 1946 |
| 2,483,929 | Owen | Oct. 4, 1949 |